United States Patent
Swihart et al.

(10) Patent No.: US 9,618,733 B2
(45) Date of Patent: Apr. 11, 2017

(54) MECHANICAL ZOOM IMAGING APPARATUS

(71) Applicant: Bio-Rad Laboratories, Inc., Hercules, CA (US)

(72) Inventors: Steve Swihart, Walnut Creek, CA (US); Evan Thrush, San Anselmo, CA (US); Evelio Perez, Hercules, CA (US); Kevin McDonald, Novato, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 164 days.

(21) Appl. No.: 14/444,709

(22) Filed: Jul. 28, 2014

(65) Prior Publication Data

US 2015/0029595 A1    Jan. 29, 2015

Related U.S. Application Data (60) Provisional application No. 61/859,646, filed on Jul. 29, 2013.

(51) Int. Cl.
    *G02B 15/14*   (2006.01)
(52) U.S. Cl.
    CPC .................... *G02B 15/14* (2013.01)
(58) Field of Classification Search
    CPC .................................................. G02B 15/14
    See application file for complete search history.

(56) References Cited

U.S. PATENT DOCUMENTS

| | | |
|---|---|---|
| 4,890,247 A | 12/1989 | Sarrine et al. |
| 5,672,881 A | 9/1997 | Striepeke et al. |
| 2002/0154396 A1 | 10/2002 | Overbeck |
| 2006/0148063 A1* | 7/2006 | Fauzzi ............... G01N 1/31 435/286.4 |
| 2011/0134238 A1* | 6/2011 | Kotchou ............. G06T 7/0018 348/140 |
| 2012/0168630 A1 | 7/2012 | Beddar et al. |
| 2012/0212739 A1 | 8/2012 | Aldstadt, III et al. |
| 2012/0307015 A1 | 12/2012 | Maier |

OTHER PUBLICATIONS

International Search Report and Written Opinion mailed Nov. 14, 2014, from PCT Application No. PCT/US2014/048484 (8 pages).
Supplementary European Search Report mailed Oct. 10, 2016 in EP 14832584.8, 10 pages.

* cited by examiner

*Primary Examiner* — Alicia M Harrington
(74) *Attorney, Agent, or Firm* — Kilpatrick Townsend & Stockton LLP (57) ABSTRACT

An imaging assembly for the viewing, imaging, and analysis of chemiluminescent or bioluminescent samples in gels or other substrates, in which an adjustable camera and lens module having a prime or fixed lens or a focusing lens is moved to change the field of view by shifting the focal plane of the camera and lens module. The imaging assembly can also include a mirror to bend or fold the optical path between the camera and lens module and the target area having a sample, in which the mirror can move in the same vertical direction as the camera and lens module. Further, the camera and lens module can be configured to more move in a diagonal direction relative to the location of the imaging target area. The imaging assembly can further have a duct system adaptable to adjust with the movement of the camera and lens module.

20 Claims, 5 Drawing Sheets

MECHANICAL ZOOM IMAGING APPARATUS

CROSS-REFERENCES TO RELATED APPLICATIONS

The present U.S. patent application claims priority to U.S. Provisional Patent Application No. 61/859,646, entitled "MECHANICAL ZOOM IMAGING APPARATUS," filed on Jul. 29, 2013, which is incorporated by reference herein.

FIELD OF THE INVENTION

The present invention generally relates to the field of imaging and apparatus for imaging biological and chemical test and assay results. More specifically, many embodiments are directed to an efficient imaging apparatus for viewing electrophoresis gels, nucleic acid blots, protein blots, or similar biochemical tests and assays at specific increased magnification and resolutions.

BACKGROUND OF THE INVENTION

Instruments and apparatus systems that are used for viewing, recording, and analyzing the results of biological and chemical tests and assays often require specific magnification in order to sufficiently image the target. Exemplary tests and assays include electrophoresis gels, nucleic acid blots, protein blots, fluorescence tests, and other chemiluminescent tests widely used in chemical and biochemical industries. In such instrumentation, the focus and magnification of the imaging apparatus is involved in properly reading and analyzing the related tests.

However, in such instrumentation, the optical path of the imaging apparatus, and the focal length of the lenses used in the instrumentation, can lead to apparatus that are complex and inefficiently sized. Further, the intensity of light emitted by chemiluminescent tests may be relatively low, such that the sensor size, read noise, dark current noise, and/or lens speed of typical CCD cameras with zoom lenses adversely affect the readings of the imaging apparatus. Moreover, zoom lenses can be difficult to obtain that have a sufficient sensitivity, focal length, and lens speed appropriate for such instrumentation.

Accordingly, there remains a need to provide imaging instrumentation that retains desired magnification, focusing, and imaging capabilities while remaining relatively compact and efficient for use in chemical and biological laboratories.

SUMMARY OF THE INVENTION

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

Embodiments of the imaging assembly include a platform having a target region, a camera and lens module mounted above the target region which has an optical path and a focal plane in the target region, where the camera and lens module is movable in a direction normal to the plane of the target region such that movement of the camera and lens module changes a field of view within the focal plane, and where the lens is a prime lens with a fixed focal length or is a focusing lens.

Further embodiments are directed toward an imaging assembly including a platform having a target region, a mirror mounted above the target region which is movable in a direction normal to the plane of the target region, a camera and lens module mounted above the platform on a horizontal plane shared with the mirror, where the camera and lens module are movable in a direction normal to the plane of the target region and also movable in a direction along an optical path between the camera and lens module and the mirror, where the camera and lens module is directed at the mirror such that the optical path of the camera and lens module has a focal plane in the target region, where the mirror and camera and lens module are synchronously movable in a direction normal to the plane of the target region such that movement of the mirror and camera and lens module changes the field of view within the focal plane, and where the lens is a prime lens having a fixed focal length or is a focusing lens. In such embodiments, the mirror can be positioned at about a 45° angle relative to the camera and lens module and relative the plane of the platform. In further embodiments, the camera and lens module can be mounted on a diagonal framework such that the camera and lens module can synchronously move in a horizontal direction relative to the mirror and in a vertical direction relative to the horizontal plane of the platform.

Further embodiments of the imaging assembly are configured to image an electrophoresis gel, a nucleic acid blot, or a protein blot. Some embodiments of the imaging assembly include a lens with a lens speed of about f/2.0, about f/1.2, about f/0.95, about f/0.84, about f/0.60, or greater. In yet further embodiments, the imaging assembly can include a sample drawer in which a sample can be positioned and moved into the target region.

Further embodiments of the imaging assembly include at least one cooling fan mounted to the camera and lens module in a position that is not in communication with the optical path. Some embodiments are configured to have at least one flexible duct in communication with the at least one cooling fan and directing air moved by the cooling fan out of the imaging assembly. Other embodiments are configured to have at least one telescoping duct in communication with the at least one cooling fan and directing air moved by the cooling fan out of the imaging assembly.

Some embodiments of the imaging assembly have an optical path with a length of between about 17 cm to about 50 cm. In embodiments, the imaging assembly optical path can change by up to about 31 cm. In some embodiments, the field of view of the camera and lens module has a width of from about 9 cm to about 21 cm.

BRIEF DESCRIPTION OF THE DRAWINGS

Illustrative aspects of the present disclosure are described in detail below with reference to the following drawing figures.

DETAILED DESCRIPTION OF THE INVENTION

Throughout this description for the purposes of explanation, numerous specific details are set forth in order to provide a thorough understanding of the many embodiments disclosed herein. It will be apparent, however, to one skilled in the art that the many embodiments may be practiced without some of these specific details. In other instances, well-known structures and devices are shown in diagram or schematic form to avoid obscuring the underlying principles of the described embodiments.

As used herein, the term "mechanical zoom", unless otherwise indicated, refers to the movement of a fixed or prime lens (i.e. a lens with a fixed focal length) such that the focal plane of the fixed lens moves through a region of space, and such that the field of view of the fixed lens increases or decreases accordingly, in effect increasing or decreasing magnification. The term "optical zoom", as used herein, only refers to the zooming action of a zoom lens (i.e. a lens assembly with a CCD having a variable focal length and a fixed imaging distance) where explicitly indicated. In contrast, as used herein, the term "focusing lens" refers to a lens assembly that has a variable focal length, but compared to a zoom lens, has a relatively small variability in focal length and relatively large variability in the field of view accomplished by changing the imaging distance. Further, as used herein, the phrase "straight optical path" refers to an optical path which is not bent or folded by any mirror or other reflecting, refracting, or diffracting medium in between a lens and the target area being viewed or imaged by a camera having that lens.

In an optical system used to image chemiluminescent blots, where emitted light can have an intensity as dim as a few picowatts per centimeter ($pW/cm^2$), sensitivity is a function of sensor size, read noise, dark current noise, and lens speed. Further, in applications where there can be more than one luminescent source, there can be cross-talk between the wavelengths of light, so accuracy and precision are important in imaging such samples. In order to improve sensitivity, accuracy, and precision, one can increase sensor size and/or increase lens speed. However, known CCD cameras that use optical zoom lenses may not provide a sufficient lens speed for the application while also being of a reasonable size for laboratory instrumentation. Moreover, for improved zoom lens sensitivity, it is sometimes desirable to have a large CCD, however, commercially available zoom lenses are often not available that meet the large format sensor sensitivity while also having a sufficiently fast lens speed. Additionally, instrumentation with zoom lenses require significant internal optical structure and interactions, making for a more complex and prone to mechanical failure instrument than an apparatus with fewer lenses and fewer interactive parts.

Fixed or prime lenses tend to be more compact and light-weight than zoom lenses, and are more readily available with larger and/or wider maximum apertures (i.e. as fast lenses). A mechanical zoom within a specified field of view can be accomplished by moving the fixed lens but still maintaining the focal plane of the lens at the target area with minor focusing adjustments. The magnification of an image changes during the mechanical zoom due to the change of the working distance (also referred to as the imaging distance) along with the focus distance of the lens, which allows the viewing of smaller and larger fields of view. A wide range of imaging techniques can make use of apparatus with a fixed lens, including but not limited to the imaging of: Coomassie-stained gels, chemiluminescent ELISA assays, fluorescent multiplex blotting assays, and other bioluminescent and/or chemiluminescent tests and assays.

In some embodiments of the imaging assembly, the space occupied by the imaging assembly is reduced and minimized, especially in the vertical direction, by folding the optical path between the camera and lens assembly and the target area. Minimizing the bench space taken up by the imaging assembly product is advantageous in order to allow for use of the apparatus in compact spaces in laboratories. In embodiments, the optical path of the imaging assembly is folded by use of a mirror located above the target area such that the height of the imaging assembly is reduced by approximately the distance from the mirror center and the camera and lens module.

In embodiments of the imaging assembly, the movement or translation of a fixed lens or lens assembly along an axis accomplishes a mechanical zoom, where the change in the distance between the lens and the viewed object leads to a change in magnification and the field of view imaged. In such embodiments, additional focusing may be necessary to obtain a clear image. Such focusing is relatively minor in terms of the scale of distances that need to be adjusted, as compared to either the mechanical zoom of the imaging apparatus or to the optical zoom of a zoom lens. In embodiments, the minor focusing or refining of the image can be accomplished by an "external" focusing, where the lens is moved with respect to the imaging sensor, but the distance between the lens and the view object remains the same. In alternative embodiments, the minor focusing or refining of the image can be accomplished by "internal" focusing by use of a focusing lens, where optical elements of a lens assembly are moved with respect to each other to change the focal length of the lens assembly within a narrow range of distances. In embodiments, a focusing lens can alter its focal length from about twenty-five millimeters (25.0 mm) to about twenty-seven point five millimeters (27.5 mm) or twenty-eight millimeters (28.0 mm). In further embodiments, a focusing lens can alter its focal length from about twenty millimeters (20.0 mm) to about thirty millimeters (30.0 mm).

While the many embodiments disclosed herein are generally directed to an efficient imaging apparatus with a compact form factor for imaging chemiluminescent or bioluminescent samples, the imaging apparatus described herein can be used for any application where a high sensitivity and compact imaging assembly would be appropriate or advantageous.

Figure 1:
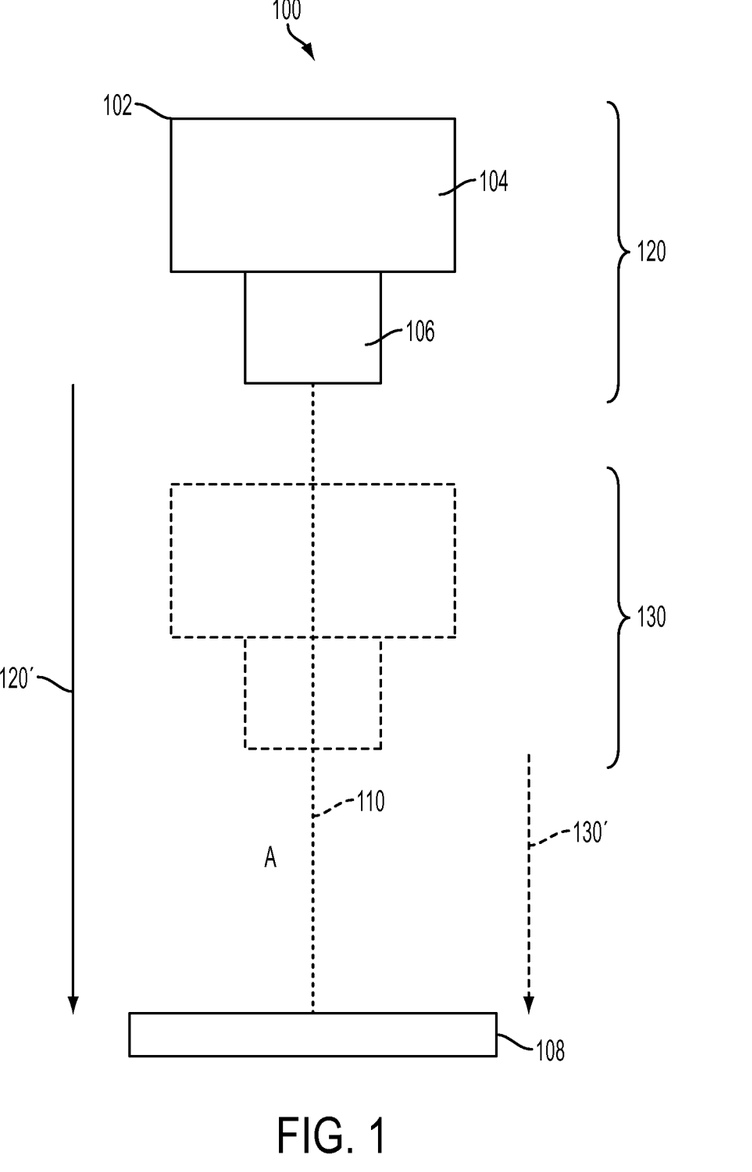
FIG. 1 is a schematic representation of an imaging assembly with an adjustable camera and lens module and a straight optical path, according to many embodiments.

FIG. 1 is a schematic representation of an imaging assembly with an adjustable camera and lens module and a straight optical path 100 according to many embodiments. A camera and lens module (CLM) 102 is primarily constructed of a camera 104 and lens 106. The camera 104 can be electronically connected to computers and non-transitory computer readable media, to which images captured by the CLM 102 are transmitted. In embodiments, the lens 106 can be a fixed lens with a fixed focal length (FFL), or a focusing lens, with a focal length of about four millimeters (4 mm) to about five hundred millimeters (500 mm). In embodiments, the lens 106 has an imaging distance of from about five centimeters (5 cm) to about one hundred fifty millimeters (150 cm). In further embodiments, the lens 106 can have an imaging distance of about fifty-five millimeters (55 cm). The lens 106 is designed and/or configured to sacrifice the capability to clearly focus at infinity for an increased capability of more clearly focusing at lengths at or close to the minimal focus distance of the lens with improved resolution and/or magnification. In embodiments, the CLM 102 has a lens speed of about f/0.95. In embodiments, the lens speed can be greater or smaller, depending on the focal length of the FFL used. Alternative embodiments of a CLM 102 can have a lens speed from about f/0.84 to about f/1.2. Further embodiments can have a lens speed of equal to or faster than about f/0.60, while some embodiments can have a lens speed of about f/2.0.

In embodiments, the CLM 102 is positioned above a transilluminator 108, where the surface of the transilluminator 108 proximate to the CLM 102 is used as a platform, which further has a target region within the field of view of the CLM 102. An optical path 110 is defined as the distance between the CLM 102 and the target area on the transilluminator 108, and has a variable length A. In such embodiments, the optical path 110 is a straight optical path which is not bent or folded by any mirror or diffracting medium in between the CLM 102 and the target area. The CLM 102 is mounted to a framework of the imaging assembly such that the CLM 102 can move in a vertical direction, specifically along an axis normal to the target area, so that the CLM 102 can be moved closer to or further from the target area.

In embodiments, at a distal CLM position 120 (distal relative to the target area), the CLM 102 is a first distance 120' from the transilluminator 108 and the target area. At the distal CLM position 120, the CLM 102 can have a field of view of the target area with a width of about twenty-one centimeters (21 cm). At a proximate CLM position 130 (proximate relative to the target area), the CLM 102 is a second distance 130' from the transilluminator 108 and the target area. At the proximate CLM position 130, the CLM 102 can have a field of view of the target area with a width of about nine centimeters (9 cm). The movement of the CLM 102 from a distal CLM position 120 to a proximate CLM position 130, or vice versa, changes the focus distance of the lens 106. Accordingly, in embodiments, the field of view of the CLM 102 can be from about nine centimeters (9 cm) to about twenty-one centimeters (21 cm). In further embodiments, depending on the focal length of the lens 106 used, the length of the first distance 120', the length of the second distance 130', and/or the size of the imaging assembly, the field of view of the CLM 102 can be from about five centimeters (5 cm) to about thirty centimeters (30 cm). In particular, the imaging assembly is configured such that movement of the CLM 102 between a distal CLM position 120 and a proximate CLM position 130 causes the focal plane of the lens 106 to be maintained at the target area on and/or within the platform defined by the transilluminator 108 by readjusting the focus of the lens during mechanical zoom. Readjusting the focus of the lens can be accomplished by either external focusing, moving the lens 106 with respect to the sensor and/or by internal focusing, where optical elements are moved with respect to each other to change the focal length of the lens assembly within a narrow range of distances.

In embodiments, the distal CLM position 120 is from about forty-eight centimeters (48 cm) to about fifty centimeters (50 cm) distant from the transilluminator 108 and related target area. In embodiments, the proximate CLM position 130 is from about seventeen centimeters (17 cm) to about twenty centimeters (20 cm) distant from the transilluminator 108 and related target area. In further embodiments, the proximate CLM position 130 can be about fifteen centimeters (15 cm) from the transilluminator and target area. In such embodiments, the vertical distance of the CLM 102 from the transilluminator 108 is the same as the optical path 110.

In embodiments, one or more fans can be mounted to the framework of the imaging assembly in a position to draw air from the inside of imaging assembly, particularly air heated by the CLM 102, out of the imaging assembly. Conversely, one or more fans can be mounted to the framework of the imaging assembly in a position to push relatively cool air from outside of imaging assembly into a space within the imaging assembly, particularly into a volume heated by the CLM 102. In embodiments, the imaging assembly may have at least one fan pushing air into the imaging assembly and at least one fan drawing air out of the imaging assembly. In further embodiments, the at least one fan is not mounted directly to a CLM 102, but rather is positioned in proximity to one or more ducts in communication with a volume of space that can be heated due to the operation of a CLM 102. In some embodiments, the at least one duct can be a flexible duct. In alternative embodiments, the at least one duct can be a telescoping duct.

In embodiments, the imaging assembly can have a shelf or drawer in which a sample gel, blot, or other substrate can be loaded, which when in a loaded position, positions the substrate to be imaged on or within the transilluminator 108. In embodiments, the transilluminator 108 includes an ultraviolet (UV) light source, which may be a single light source, or an array of light sources, arranged within a box-like container or drawer configured to slide into and out of a base portion of the imaging assembly. In some embodiments, the transilluminator further includes a glass positioned above the UV light source, in which the glass is transmissive to UV light but does not transmit visible light. A sample gel or blot can be placed on the upper surface of the UV transmissive glass of the transilluminator 108, which is then positioned within the imaging assembly. Thus, the sample placed on the surface of the transilluminator 108 glass can be illuminated primarily with UV light for imaging. The focal plane imaged by the CLM 102 is designed to be approximately along or just above the plane of the UV transmissive glass where the sample is located.

Figure 2A:
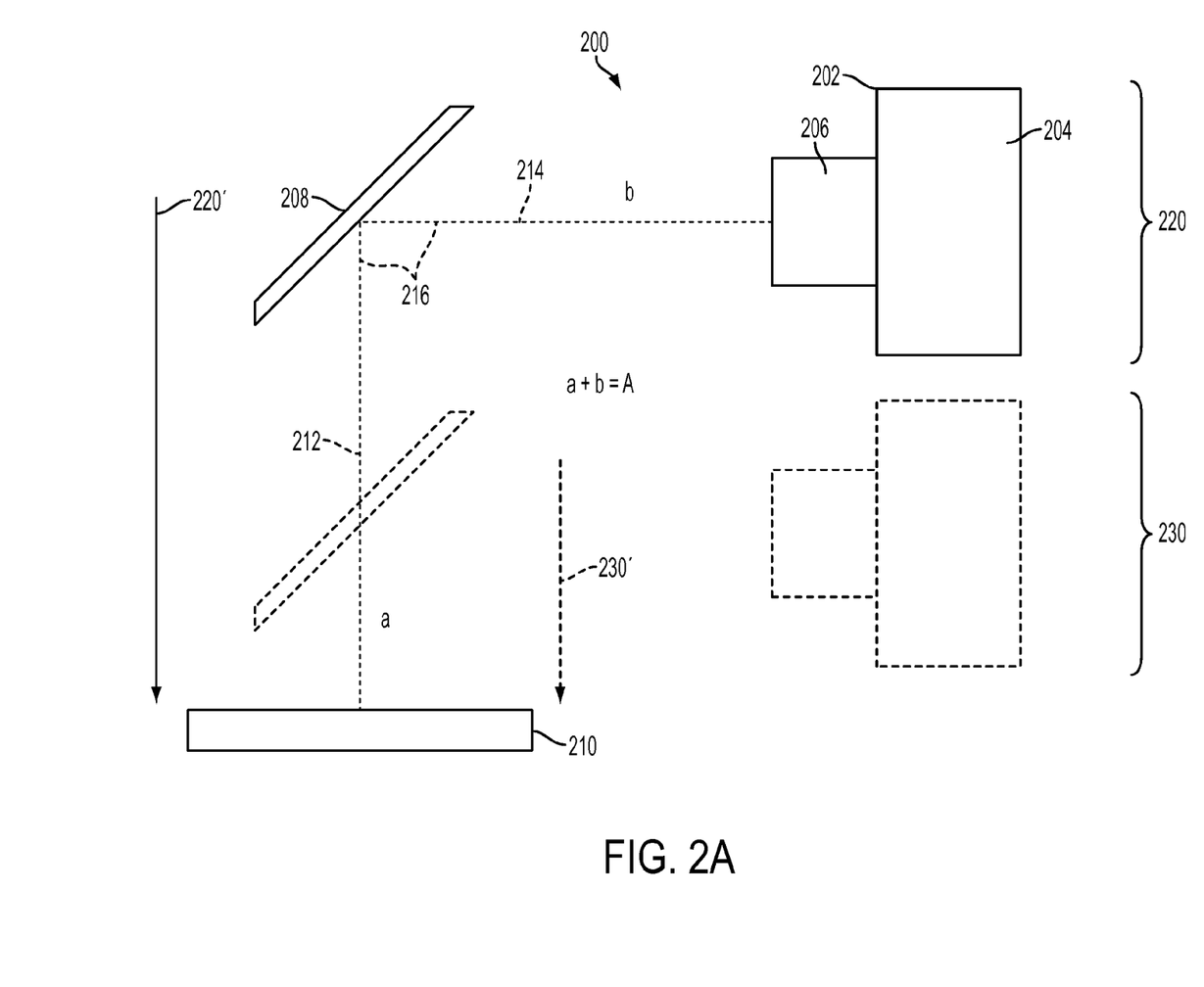
FIGS. 2A and 2B are schematic representation of an imaging assembly with an adjustable camera and lens module and a folded optical path, according to many embodiments.

FIG. 2A is a schematic representation of an embodiment of an imaging assembly with an adjustable camera and lens module and a folded optical path 200, according to many embodiments. In embodiments of the imaging assembly with an adjustable camera and lens module with a folded optical path 200, the space occupied by the imaging assembly is reduced as compared with the imaging assembly with an adjustable camera and lens module and a straight optical path 100, especially in the vertical direction, due to the folding of the optical path. However, the overall length of the optical path in both the adjustable camera and lens module with a straight optical path 100 and the adjustable camera and lens module with a folded optical path 200 embodiments of the imaging assembly can be equivalent, allowing for equal imaging and magnification capabilities in either embodiment.

In an embodiment of the imaging assembly with an adjustable camera and lens module with a folded optical path 200, a camera and lens module (CLM) 202 is primarily constructed of a camera 204 and lens 206. The camera 204 can be connected to computers and non-transitory computer readable media, to which images captured by the CLM 202 are transmitted. In embodiments, the lens 206 can be a fixed lens with a fixed focal length (FFL), or a focusing lens, with a focal length of about four millimeters (4 mm) to about five hundred millimeters (500 mm). In embodiments, the lens 206 has an imaging distance of from about five centimeters (5 cm) to about one hundred fifty centimeters (150 cm). In further embodiments, the lens 206 can have an imaging distance of about fifty-five centimeters (55 cm). The lens 206 is configured to sacrifice the capability to clearly focus at infinity for an increased capability of more clearly focusing at or close to the minimal focus distance of the lens with improved resolution and/or magnification. In embodiments, the CLM 202 has a lens speed of f/0.95. In embodiments, the lens speed can be greater or smaller, depending on the focal length of the FFL used. Alternative embodiments of a CLM 202 can have a lens speed from about f/0.84 to about f/1.2. Further embodiments can have a lens speed of equal to or faster than about f/0.60, while some embodiments can have a lens speed of about f/2.0.

In embodiments, the CLM 202 is positioned above a transilluminator 210, where the surface of the transilluminator 210 proximate to the CLM 202 is used as a platform. The CLM 202 is horizontally offset from the platform surface of the transilluminator 210 such that the CLM 202 is not directly above the center of the platform. In such embodiments, a mirror 208 is positioned above the transilluminator 210 along an axis normal to a target region on and/or within the platform defined by the transilluminator 210. The mirror 208 is positioned to bend an optical path from the CLM 202 to the target area of the transilluminator 210, such that the target region is within the field of view of the CLM 202. An optical path 216 is the sum of a vertical portion 212 of the optical path 216 between the surface of the transilluminator 210 and the center of the mirror 208 and a horizontal portion 214 of the optical path 216 between the CLM 202 and center of the mirror 208. The vertical portion 212 of the optical path 216 has a variable length a, and the horizontal portion 214 of the optical path 216 has a length b. Accordingly, length A of the optical path 216 is defined as the distance equal to the sum of the vertical distance 212 between the surface of the transilluminator 210 and the center of the mirror 208 and the horizontal distance 214 between the CLM 202 and center of the mirror 208. The length A of the optical path 216 is variable, which changes in proportion to the change in the length of a. In such embodiments, the optical path 216 is considered a folded or bent optical path which is redirected by a mirror or diffracting medium in between the CLM 202 and the target area. In some embodiments, the horizontal portion 214 of the optical path 216 having of length b can also be a variable length, and variable length A of the optical path 216 changes in proportion to the change in the lengths of a and b in the imaging assembly with an adjustable camera and lens module with a folded optical path 200.

The mirror 208 is mounted to a framework of the imaging assembly such that the mirror 208 can move in a vertical direction, specifically along an axis normal to the target area, so that the mirror 208 can be moved closer to or further from the target area. The CLM 202 is configured to be directed at the mirror 208 such that the optical path 216 of the CLM 202 has a focal plane in the target region. The mirror 208 and CLM 202 are further configured to be synchronously movable in a direction normal to the plane of the target region, such that movement of the mirror 208 and CLM 202 changes the imaging distance and focus is maintained at the target and/or within the transilluminator 210 by focusing the lens.

In embodiments, the CLM 202 moves in a diagonal direction relative to the platform and target region, such that as the mirror 208 and CLM 202 move in a vertical direction away from the transilluminator 210, the CLM 202 also moves in a horizontal direction away from the transilluminator 210. Similarly, as the mirror 208 and CLM 202 move in a vertical direction closer toward the transilluminator 210, the CLM 202 also moves in a horizontal direction closer toward the transilluminator 210. The CLM 202 moves on a horizontal axis that shares a plane with the mirror 208, where horizontal axis is parallel to the horizontal portion 214 of the optical path 216 between the CLM 202 and the center of the mirror 208. In embodiments, the mirror 208 and CLM 202 are mounted to the framework such that the movement of the mirror 208 and CLM 202 is smooth and can securely rest at any point along the movement track of the framework.

In embodiments, at a distal mirror and CLM position 220 (distal relative to the target area), the mirror 208 is a first distance 220' from the transilluminator 210 and the target area. At the distal mirror and CLM position 220, the CLM 202 can have a field of view of the target area with a width of about twenty-one centimeters (21 cm). At a proximate mirror and CLM position 230 (proximate relative to the target area), the mirror 208 is a second distance 230' from the transilluminator 210 and the target area. At the mirror and proximate CLM position 230, the CLM 202 can have a field of view of the target area with a width of about nine centimeters (9 cm). Accordingly, in embodiments, the field of view of the CLM 202 can be from about nine centimeters (9 cm) to about twenty-one centimeters (21 cm). In further embodiments, depending on the focal length of the lens 206 used the length of the first distance 220', the length of the second distance 230', and/or the size of the imaging assembly, the field of view of the CLM 202 can be from about five centimeters (5 cm) to about thirty centimeters (30 cm). The movement of the mirror 208 and CLM 202 from a distal mirror and CLM position 220 to a proximate mirror and CLM position 230, or vice versa, moves the focal plane of the lens 206. In particular, the imaging assembly is configured such that movement of the mirror 208 and CLM 202 between a distal mirror and CLM position 220 and a proximate mirror and CLM position 230 causes the imaging distance of the lens 206 to change and focus is maintained at the target area on and/or within the platform defined by the transilluminator 210. Readjusting the focus of the lens can be accomplished by either external focusing, moving the lens 206 with respect to the sensor and/or by internal focusing, where optical elements are moved with respect to each other to change the focal length of the lens assembly within a narrow range of distances.

Figure 2B:
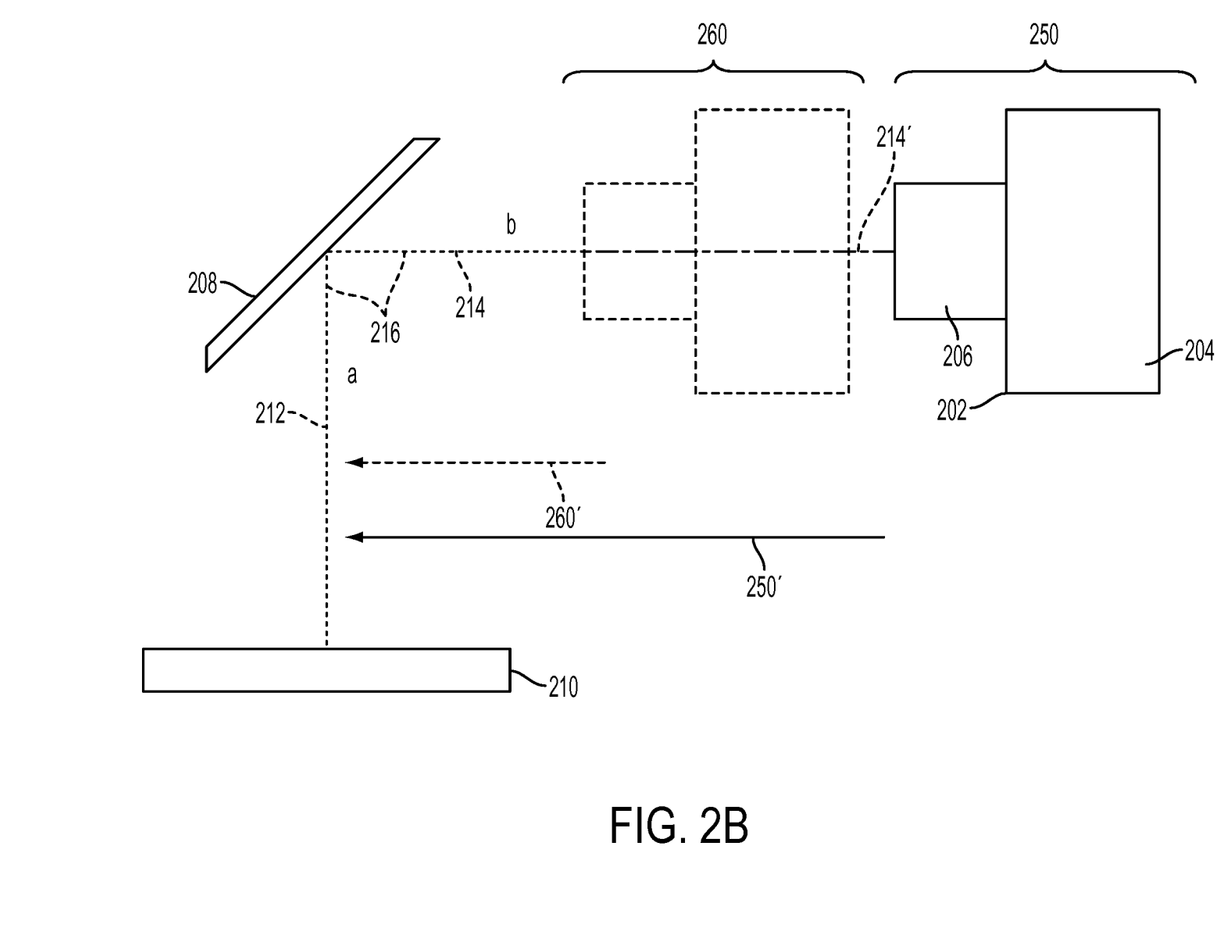

FIG. 2B is a schematic representation of an embodiment of an imaging assembly with an adjustable camera and lens module and a folded optical path 200, according to many embodiments. As in embodiments of the imaging assembly represented by FIG. 2A, the space occupied by the imaging assembly is reduced as compared with the imaging assembly with an adjustable camera and lens module and a straight optical path 100, especially in the vertical direction, due to the folding of the optical path, while the overall length of the optical path in both can be equivalent, allowing for equal imaging and magnification capabilities in either embodiment.

In embodiments, the CLM 202 is positioned above a transilluminator 210, where the surface of the transilluminator 210 proximate to the CLM 202 is used as a platform. The CLM 202 is horizontally offset from the platform surface of the transilluminator 210 such that the CLM 202 is not directly above the center of the platform. In such embodiments, a mirror 208 is positioned above the transilluminator 210 along an axis normal to a target region on and/or within the platform defined by the transilluminator 210. The mirror 208 is positioned to bend an optical path from the CLM 202 to the target area of the transilluminator 210, such that the target region is within the field of view of the CLM 202. An optical path 216 is the sum of a vertical portion 212 of the optical path 216 between the surface of the transilluminator 210 and the center of the mirror 208 and a horizontal portion 214 of the optical path 216 between the CLM 202 and center of the mirror 208. The horizontal portion 214 of the optical path 216 has a variable length b, and the vertical portion 212 of the optical path 216 has a length a. Accordingly, length A of the optical path 216 is defined as the distance equal to the sum of the vertical distance 212 between the surface of the transilluminator 210 and the center of the mirror 208 and the horizontal distance 214 between the CLM 202 and center of the mirror 208. The length A of the optical path 216 is variable, which changes in proportion to the change in the length of b. In such embodiments, the optical path 216 is considered a folded or bent optical path which is redirected by a mirror or diffracting medium in between the CLM 202 and the target area. In some embodiments, the vertical portion 212 of the optical path 216 having of length a can also be a variable length, and variable length A of the optical path 216 changes in proportion to the change in the lengths of a and b in the imaging assembly with an adjustable camera and lens module with a folded optical path 200.

The mirror 208 can be mounted to a framework of the imaging assembly such that the mirror 208 is fixed in a vertical position along an axis normal to the target area. The CLM 202 is configured to be directed at the mirror 208 such that the optical path 216 of the CLM 202 has a focal plane in the target region. The CLM 202 can be further configured to be movable along a horizontal axis that shares a plane with the mirror 208, where horizontal axis is parallel to the horizontal portion 214 of the optical path 216 between the CLM 202 and the center of the mirror 208. Such movement of the CLM 202 changes the imaging distance, and focus is maintained at the target and/or within the transilluminator 210 by focusing the lens. In embodiments, the CLM 202 is mounted to the framework such that the horizontal movement of the CLM 202 is smooth and can securely rest at any point along the movement track of the framework.

In embodiments, at a distal CLM position 250 (distal relative to the mirror 208), the CLM 202 is a first distance 250' from the mirror 208. At the distal CLM position 250, the CLM 202 can have a field of view of the target area with a width of about twenty-one centimeters (21 cm). At the distal CLM position 250, the horizontal portion 214' of the optical path is of a length greater than the horizontal portion 214 at the proximate CLM position 260, where the difference between the length of those horizontal portions can be less than, equal to, or greater than the length of the CLM 202. At a proximate CLM position 260 (proximate relative to the mirror 208), the CLM 202 is a second distance 260' from the mirror 208. At the proximate CLM position 260, the CLM 202 can have a field of view of the target area with a width of about nine centimeters (9 cm). Accordingly, in embodiments, the field of view of the CLM 202 can be from about nine centimeters (9 cm) to about twenty-one centimeters (21 cm). In further embodiments, depending on the focal length of the lens 206 used the length of the first distance 250', the length of the second distance 260', and/or the size of the imaging assembly, the field of view of the CLM 202 can be from about five centimeters (5 cm) to about thirty centimeters (30 cm). The movement of the CLM 202 from a distal CLM position 250 to a proximate CLM position 260, or vice versa, moves the focal plane of the lens 206. In particular, the imaging assembly is configured such that movement of the CLM 202 between a distal CLM position 250 and a proximate CLM position 260 causes the imaging distance of the lens 206 to change, and focus is maintained at the target area on and/or within the platform defined by the transilluminator 210. Readjusting the focus of the lens can be accomplished by either external focusing, moving the lens 206 with respect to the sensor and/or by internal focusing, where optical elements are moved with respect to each other to change the focal length of the lens assembly within a narrow range of distances.

In embodiments, in the distal mirror and CLM position 220, the CLM 202 has an optical path 216 from about forty-eight centimeters (48 cm) to about fifty centimeters (50 cm) distant from the transilluminator 210 and related target area. In embodiments, in the proximate mirror and CLM position 230, the CLM 202 has an optical path 216 from about seventeen centimeters (17 cm) to about twenty centimeters (20 cm) distant from the transilluminator 210 and related target area. In further embodiments, the proximate mirror and CLM position 230 can be about fifteen centimeters (15 cm) from the transilluminator and target area.

In embodiments, one or more fans can be mounted to the framework of the imaging assembly in a position to draw air from the inside of imaging assembly, particularly air heated by the CLM 202, out of the imaging assembly. Conversely, one or more fans can be mounted to the framework of the imaging assembly in a position to push relatively cool air from outside of imaging assembly into a space within the imaging assembly, particularly into a volume heated by the CLM 202. In embodiments, the imaging assembly may have at least one fan pushing air into the imaging assembly and at least one fan drawing air out of the imaging assembly. In further embodiments, the at least one fan is not mounted directly to a CLM 202 or to the mirror 208, but rather is positioned in proximity to one or more ducts in communication with a volume of space that can be heated due to the operation of a CLM 202. In some embodiments, the at least one duct can be a flexible duct. In alternative embodiments, the at least one duct can be a telescoping duct.

In embodiments, the imaging assembly can have a shelf or drawer in which a sample gel, blot, or other substrate can be loaded, which when in a loaded position, positions the substrate to be imaged on or within the transilluminator 210. In embodiments, the transilluminator 210 includes an ultraviolet (UV) light source, which may be a single light source, or an array of light sources, arranged within a box-like container or drawer configured to slide into and out of a base portion of the imaging assembly. In some embodiments, the transilluminator further includes a glass positioned above the UV light source, in which the glass is transmissive to UV light but does not transmit visible light. A sample gel or blot can be place on the upper surface of the UV transmissive glass of the transilluminator 210, which is then positioned within the imaging assembly. Thus, the sample placed on the surface of the transilluminator 210 glass can be illuminated primarily with UV light for imaging. The focal plane imaged by the CLM 202 is designed to be approximately along or just above the plane of the UV transmissive glass where the sample is located.

Figure 3:
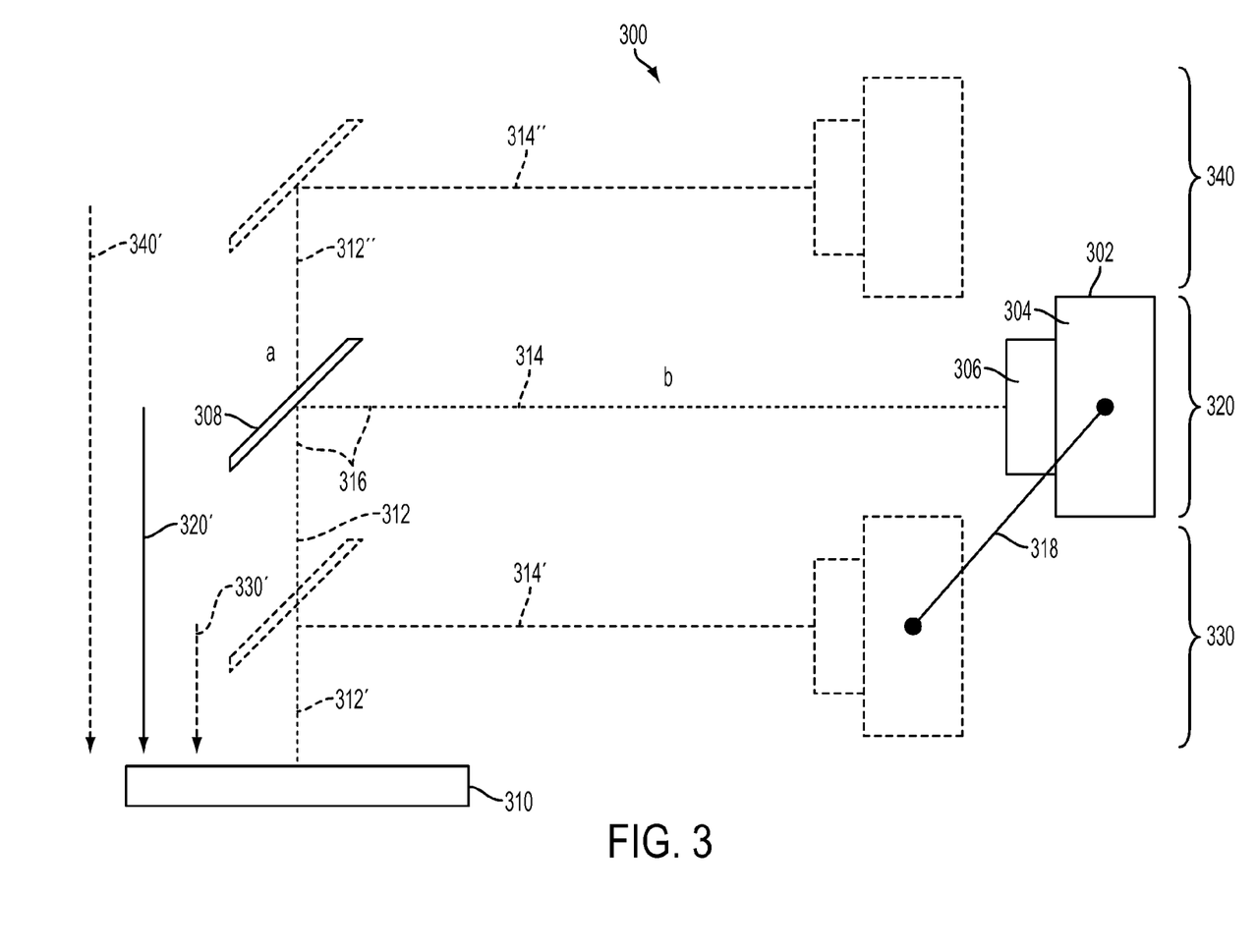
FIG. 3 is a schematic representation of an imaging assembly with an adjustable camera and lens module and a folded optical path, according to many embodiments.

FIG. 3 is a schematic representation of an imaging assembly with an adjustable camera and lens module and a folded optical path 300 according to many embodiments. In embodiments of the imaging assembly with an adjustable camera and lens module with a folded optical path 300, a camera and lens module (CLM) 302 is primarily constructed of a camera 304 and lens 306. The camera 304 can be connected to computers and non-transitory computer readable media, to which images captured by the CLM 302 are transmitted. In embodiments, the lens 306 can be a fixed lens with a fixed focal length (FFL), or a focusing lens, with a focal length of about four millimeters (4 mm) to about five hundred millimeters (500 mm). In embodiments, the lens 306 has an imaging distance of from about five centimeters (5 cm) to about one hundred fifty centimeters (150 cm). In further embodiments, the lens 306 can have an imaging distance of about fifty-five centimeters (55 cm). The lens 306 is configured to sacrifice the capability to clearly focus at infinity for an increased capability of more clearly focusing at or close to the minimal focus distance of the lens with improved resolution and/or magnification. In embodiments, the CLM 302 has a lens speed of f/0.95. In embodiments, the lens speed can be greater or smaller, depending on the focal length of the FFL used. Alternative embodiments of a CLM 302 can have a lens speed from about f/0.84 to about f/1.2. Further embodiments can have a lens speed of equal to or faster than about f/0.60, while some embodiments can have a lens speed of about f/2.0.

The CLM 302 is positioned above a transilluminator 310, where the surface of the transilluminator 310 proximate to the CLM 302 is used as a platform. The CLM 302 is horizontally offset from the platform surface of the transilluminator 310 such that the CLM 302 is not directly above the center of the platform. In such embodiments, a mirror 308 is positioned above the transilluminator 310 along an axis normal to a target region on and/or within the platform defined by the transilluminator 310. The mirror 308 is positioned to bend an optical path from the CLM 302 to the target area of the transilluminator 310, such that the target region is within the field of view of the CLM 302. An optical path 316 is the sum of a vertical portion 312 of the optical path 316 between the surface of the transilluminator 310 and the center of the mirror 308 and a horizontal portion 314 of the optical path 316 between the CLM 302 and center of the mirror 308. Accordingly, length A of the optical path 316 is defined as the distance equal to the sum of the vertical distance 312 between the surface of the transilluminator 310 and the center of the mirror 308 and the horizontal distance 314 between the CLM 302 and center of the mirror 308. The vertical portion 312 of the optical path 316 has a variable length a, and the horizontal portion 314 of the optical path 316 has a variable length b. Accordingly, the optical path 316 has a variable length A, which changes in proportion to the change in the lengths of a and b in the imaging assembly with an adjustable camera and lens module with a folded optical path 301. In such embodiments, the optical path 316 is considered a folded or bent optical path which is redirected by a mirror or diffracting medium in between the CLM 302 and the target area.

The mirror 308 is mounted to a framework of the imaging assembly such that the mirror 308 can move in a vertical direction, specifically along an axis normal to the target area, so that the mirror 308 can be moved closer to or further from the target area. The CLM 302 is configured to be directed at the mirror 308 such that the optical path 316 of the CLM 302 has a focal plane in the target region. The mirror 308 and CLM 302 are further configured to be synchronously movable in a direction normal to the plane of the target region, such that movement of the mirror 308 and CLM 302 changes the imaging distance and focus is maintained at the target region on and/or within the transilluminator 310 by refocusing the lens. In embodiments of the imaging assembly, the CLM 302 is mounted onto a framework of the imaging assembly to move along a diagonal direction 318 relative to the platform and target region, such that as the mirror 308 and CLM 302 move in a vertical direction away from the transilluminator 310, the CLM 302 also moves in a horizontal direction away from the transilluminator 310. Similarly, as the mirror 308 and CLM 302 move in a vertical direction closer toward the transilluminator 310, the CLM 302 also moves in a horizontal direction closer toward the transilluminator 310. The CLM 302 moves on a horizontal axis that shares a plane with the mirror 308, where horizontal axis is parallel to the horizontal portion 314 of the optical path 316 between the CLM 302 and the center of the mirror 308. In alternative embodiments, the CLM 302 does not move in a horizontal direction, and simply moves in a vertical direction parallel with the mirror 308 relative to the transilluminator 310. In embodiments, the mirror 308 and CLM 302 are mounted to the framework such that the movement of the mirror 308 and CLM 302 is smooth and can securely rest at any point along the movement track of the framework.

At a proximate mirror and CLM position 330 (proximate relative to the target area), the mirror 308 is at a proximate distance 330' from the transilluminator 310 and the target area. At the mirror and proximate CLM position 330, the CLM 302 can have a field of view of the target area with a width of about nine centimeters (9 cm). At the proximate mirror and CLM position 330, the sum of the vertical portion 312' and the horizontal portion 314' constitute the total length of the optical path 316. At a first distal mirror and CLM position 320 (distal relative to the target area, where the distance between the CLM 302 and the mirror 308 is variable), the mirror 308 is a first distal distance 320' from the transilluminator 310 and the target area. At the first distal mirror and CLM position 320, the sum of the vertical portion 312 and the horizontal portion 314 constitute the total length of the optical path 316. At the first distal mirror and CLM position 320, the CLM 302 can have a field of view of the target area with a width of about twenty-one centimeters (21 cm). In the first distal mirror and CLM position 320, the CLM 302 is configured to move along the diagonal direction 318. In embodiments, at a second distal mirror and CLM position 340, (where the distance between the CLM 302 and the mirror 308 is not variable or does not change as the mirror 308 and CLM 302 move vertically relative to the transilluminator 310) the mirror 308 is a second distal distance 340' from the transilluminator 310 and the target area. At the second distal mirror and CLM position 340, the sum of the vertical portion 312" and the horizontal portion 314" constitute the total length of the optical path 316. In the second distal mirror and CLM position 340, the CLM 302 is not configured to move along any diagonal direction, but rather moves in a direction normal to the plane of the target region parallel to the mirror 308. In comparing the first distal mirror and CLM position 320 and the second distal mirror and CLM position 340, both embodiments of the imaging assembly with an adjustable camera and lens module and a folded optical path 300 can have an equal optical path length 316 for a distal position of the CLM 302 (i.e. the sum of vertical portion 312 and horizontal portion 314 can be equal to the sum of vertical portion 312" and horizontal portion 314"), and both occupy a reduced space as compared with the imaging assembly with an adjustable camera and lens module and a straight optical path 100. In contrast, however, the vertical portion 312 of the optical path 316 at the first distal mirror and CLM position 320 is shorter than the vertical portion 312" of the optical path 316 at the second distal mirror and CLM position 340. Conversely, the horizontal portion 314 of the optical path 316 at the first distal mirror and CLM position 320 is longer than the horizontal portion 314" of the optical path 316 at the second distal mirror and CLM position 340. At the second distal mirror and CLM position 340, the CLM 302 can also have a field of view of the target area with a width of about twenty-one centimeters (21 cm). Accordingly, in embodiments, the field of view of the CLM 302 can be from about nine centimeters (9 cm) to about twenty-one centimeters (21 cm). In further embodiments, depending on the focal length of the lens 306 used, the length of a first distal distance 320', the length of a second distal distance 340', the length of the proximate distance 330', and/or the size of the imaging assembly, the field of view of the CLM 302 can be from about five centimeters (5 cm) to about thirty centimeters (30 cm).

The movement of the mirror 308 and CLM 302 from either distal mirror and CLM position 320 or 340 to a proximate mirror and CLM position 330, or vice versa, moves the focal plane of the lens 306. In particular, the imaging assembly is configured such that movement of the mirror 308 and CLM 302 between a distal mirror and CLM position 320 or 340 and a proximate mirror and CLM position 330 causes the image distance of the lens 306 to change and focus is maintained at the target area on and/or within the platform defined by the transilluminator 310 by changing the focus of the lens. Readjusting the focus of the lens can be accomplished by either external focusing, moving the lens 306 with respect to the sensor and/or by internal focusing, where optical elements are moved with respect to each other to change the focal length of the lens assembly within a narrow range of distances.

In embodiments, in the both distal mirror and CLM positions 320 and 340, the CLM 302 has an optical path 316 from about forty-eight centimeters (48 cm) to about fifty centimeters (50 cm) distant from the transilluminator 310 and related target area. In embodiments, in the proximate mirror and CLM position 330, the CLM 302 has an optical path 316 from about seventeen centimeters (17 cm) to about twenty centimeters (20 cm) distant from the transilluminator 310 and related target area. In further embodiments, the proximate mirror and CLM position 330 can be about fifteen centimeters (15 cm) from the transilluminator and target area.

In embodiments, the imaging assembly can have a shelf or drawer in which a sample gel, blot, or other substrate can be loaded, which when in a loaded position, positions the substrate to be imaged on or within the transilluminator 310. In embodiments, the transilluminator 310 includes an ultraviolet (UV) light source, which may be a single light source, or an array of light sources, arranged within a box-like container or drawer configured to slide into and out of a base portion of the imaging assembly. In some embodiments, the transilluminator further includes a glass positioned above the UV light source, in which the glass is transmissive to UV light but does not transmit visible light. A sample gel or blot can be place on the upper surface of the UV transmissive glass of the transilluminator 310, which is then positioned within the imaging assembly. Thus, the sample placed on the surface of the transilluminator 310 glass can be illuminated primarily with UV light for imaging. The focal plane imaged by the CLM 302 is designed to be approximately along or just above the plane of the UV transmissive glass where the sample is located.

In some embodiments of the imaging assembly, a CLM and mirror structure may be configured to further reduce the overall height of the imaging assembly. In such embodiments, a mirror may be positioned at an angle of less than 45° relative to a horizontal plane parallel to the plane of the platform. A CLM can thus be located above the plane of the platform and below the mirror, but still directed at the mirror such that the optical path of the CLM has a field of view within the target region of the imaging assembly. In yet further embodiments, more than one mirror may be used to bend the optical path with the result of a more compact imaging assembly.

In some embodiments of the imaging assembly with a folded optical path, a CLM and mirror may be mounted to an infrastructure of the imaging assembly such that the CLM and mirror move synchronously in incremental distances along the framework. In such embodiments, the CLM and mirror assembly may securely rest at ratchet points (or other such structures) so as to have a specific optical path length between the CLM and the target region at each incremental stop. Similarly, in embodiments of the imaging assembly with a straight optical path, a CLM may be mounted to an infrastructure of the imaging assembly such that the CLM moves in incremental distances along the framework. In such embodiments, the CLM may securely rest at ratchet points (or other such structures) so as to have a specific optical path length between the CLM and the target region at each incremental stop.

Most chemiluminescence imagers known in the field position cameras external to a sample area and housing, so that ambient air is used for cooling, which when heated up is exhausted by fans in the camera. In embodiments of the imaging apparatus herein, a cooled camera and lens module is moved within a controlled environment and shell structure or housing. Accordingly, the cameras used in the imaging assembly can be cooled using fans external to the camera. Moreover, the fans can be connected to ducts to direct and channel cool and/or heated air to and/or from the cameras. Such ducts can adjust in tandem with the motion of the camera and lens modules and/or mirrors of the imaging assembly. In embodiments, ducts connected to the fans can adjust by being flexible or by telescoping along the axis of motion of the camera and lens modules.

Figure 4A:
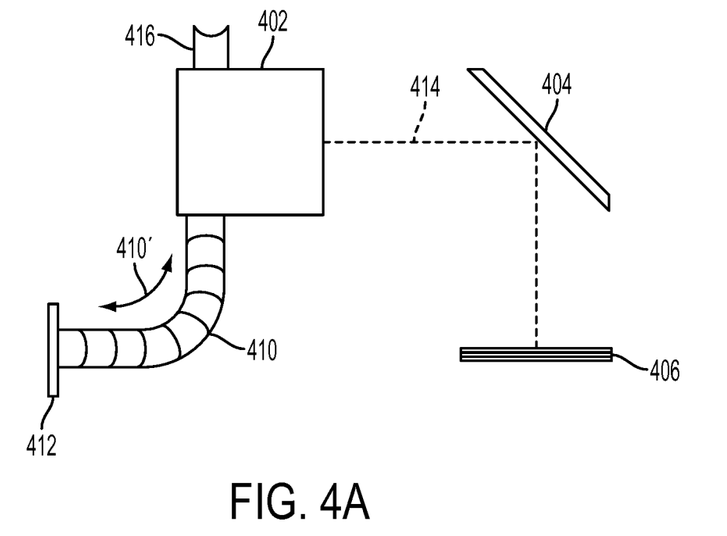
FIGS. 4A and 4B are schematic representations of ducts used in conjunction with an adjustable camera and lens module of an imaging assembly, according to many embodiments.
Figure 4B:
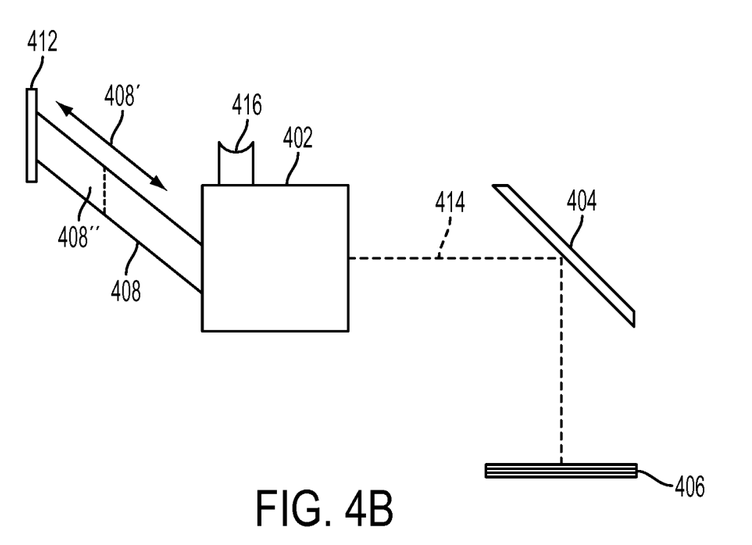

FIGS. 4A and 4B are schematic representations of ducts used in conjunction with an adjustable camera and lens module of an imaging assembly according to many embodiments. In both illustrated embodiments, a housing 402 holds a camera and lens module (CLM) within a contained space such that air heated by the operation of the camera is not in communication with air in contact with any sample or gel located on or within the target area 406 of the imaging apparatus. In embodiments, the CLM within the housing 402 has an optical path 414 that reflects off of the mirror 404 and toward the target area 406 such that the focal plane and filed of view of the CLM is within the target area 406. In the embodiment as seen in FIG. 4A, a flexible duct 410 is connected to the housing on one end and is connected to a fan 412 on its opposing end. In the embodiment as seen in FIG. 4B, a telescoping duct 408 is connected to the housing on one end and is connected to a fan 412 on its opposing end. In both embodiments, the fan 412 operates to move air so as to cool the camera within the housing 402 and the air within the housing 402. In some embodiments, the fan 412 may push ambient air into the housing 402, while in other embodiments the fan may draw air from out of the housing 402. The housing 402 can further have an intake vent or exhaust 416 (not in communication with the space in which a sample or gel is held) to allow for circulation of air through the housing. In further embodiments, there may be more than one fan and/or more than one duct connected to the housing in order to move air from within the housing 402.

In embodiments, the intake vent or exhaust 416 does not have a fan physically mounted to the structure of the intake vent or exhaust 416. Rather, the intake vent or exhaust 416 provides an airway for the intake of air into, or expulsion of air from, the internal space of the housing 402 driven by at least one fan 412 connected to a flexible duct 410 or a telescoping duct 408. In other words, a fan 412 that pushes ambient air into the housing 402 to cool the camera allows for air to leave the housing through an exhaust 416. Conversely, a fan 412 that draws ambient air out of the housing 402 to cool the camera allows for air to enter the housing through an intake vent 416 In such embodiments, the target area and platform of the transilluminator 406 where samples reside are isolated from the (relatively turbulent) airflow cooling the camera and the space within the housing 402 driven by the at least one fan 412, and are generally isolated from any ambient airflow of the surrounding environment.

In embodiments, the housing 402 can move in vertical and/or horizontal directions relative to the target area 406. Accordingly a duct connected to the housing 402 in many embodiments will adjust according to the motion of the housing. In the embodiment as seen in FIG. 4A, the flexible duct 410 can be a tube or hose which can move and adjust along a range of motion 410'. The flexible duct 410 may be a ribbed tube or a smooth tube and may be made from any appropriate sufficiently flexible materials. In the embodiment as seen in FIG. 4B, the telescoping duct 408 can be a tube or hose which can move and adjust along a range of motion 408'. The telescoping duct 408 may be a ribbed tube or a smooth tube and may be made from any appropriate sufficiently rigid materials. The telescoping duct 408 may have a minimum length 408" defined by the lengths of the ducts constituent parts. Both the flexible duct 410 and the telescoping duct 408 may be mounted or anchored to the infrastructure of the imaging apparatus independent from any physical connection to the housing 402. In embodiments, a fan 412 is connected to the end of the duct distal from the housing. In other embodiments, one or more fans may be indirectly in communication with the ducts in a location where the one or more fans can draw air from or push air into the housing 402.

In such embodiments as seen in FIGS. 4A and 4B, the at least one fan is mounted to the infrastructure of the imaging assembly and is not mounted or physically connected to a camera or camera and lens module. Thus, the weight of the camera and lens module does not include the weight of a fan and is accordingly easier to move. In further embodiments, the air moved by the at least one fan cools the camera and housing 402, but is not in communication with the space in which samples are imaged. Accordingly, while providing cooling air to the camera, the sample product inside the housing 402 is not heated by air warmed by the camera. Further, in such embodiments, by use of at least one duct, the air within the system (i.e. the space in communication with the target area and sample platform) is not impacted and relatively still (i.e. not influenced by significant or turbulent airflow), thereby reducing the drying and/or desiccation that may occur to gels and blots and other sample substrates. Yet further, such embodiments prevent the inside of the camera or other parts of the camera and lens module from being negatively affected by vapors from liquids that are part of the sample, such as acetic acid.

The above description is illustrative and is not restrictive, and as it will become apparent to those skilled in the art upon review of the disclosure, that the present invention may be embodied in other specific forms without departing from the essential characteristics thereof For example, any of the aspects described above may be combined into one or several different configurations, each having a subset of aspects. Further, throughout the foregoing description, for the purposes of explanation, numerous specific details were set forth in order to provide a thorough understanding of the invention. It will be apparent, however, to persons skilled in the art that these embodiments may be practiced without some of these specific details. These other embodiments are intended to be included within the spirit and scope of the present invention. Accordingly, the scope of the invention should, therefore, be determined not with reference to the above description, but instead should be determined with reference to the following and pending claims along with their full scope of legal equivalents.

What is claimed is:

1. An imaging assembly comprising:
    a platform having a target region;
    a camera and lens module mounted above the target region and having an optical path with a focal plane in the target region, wherein the optical path has a length of between about 20 cm to about 50 cm;
    the camera and lens module being movable in a direction normal to the plane of the target region such that movement of the camera and lens module changes a field of view within the focal plane; and
    the lens being a prime lens having a fixed focal length.

2. An imaging assembly according to claim 1, wherein the assembly is configured to image an electrophoresis gel, a nucleic acid blot, or a protein blot.

3. An imaging assembly according to claim 1, wherein the lens has a lens speed of about f/0.95 or greater.

4. An imaging assembly according to claim 1, further comprising at least one cooling fan mounted a framework of the imaging assembly in a position that is not in communication with the optical path.

5. An imaging assembly according to claim 4, further comprising at least one flexible duct in communication with the at least one cooling fan and directing air moved by the cooling fan out of the imaging assembly.

6. An imaging assembly according to claim 4, further comprising at least one telescoping duct in communication with the at least one cooling fan and directing air moved by the cooling fan out of the imaging assembly.

7. An imaging assembly according to claim 1, wherein the length of the optical path can change by up to about 31 cm.

8. An imaging assembly according to claim 1, wherein the field of view of the camera and lens module has a width of from about 9 cm to about 21 cm.

9. An imaging assembly according to claim 1, further comprising a sample drawer in which a sample can be positioned and moved into the target region.

10. An imaging assembly comprising:
    a platform having a target region;
    a mirror mounted above the target region and movable in a direction normal to the plane of the target region;
    a camera and lens module mounted above the platform on a horizontal plane shared with the mirror, the camera and lens module being movable in a direction within a plane normal to the plane of the target region and movable in a direction along an optical path between the camera and lens module and the mirror;

the camera and lens module being directed at the mirror such that the optical path of the camera and lens module has a focal plane in the target region, wherein the optical path has a length of between about 20 cm to about 50 cm;

the mirror and camera and lens module being synchronously movable in a direction normal to the plane of the target region such that movement of the mirror and camera and lens module changes a field of view within the focal plane; and the lens being a prime lens having a fixed focal length.

11. An imaging assembly according to claim 10, wherein the mirror is positioned at about a 45° angle relative to the camera and lens module and relative the plane of the platform.

12. An imaging assembly according to claim 10, wherein the assembly is configured to image an electrophoresis gel, a nucleic acid blot, or a protein blot.

13. An imaging assembly according to claim 10, wherein the lens has a lens speed of about f/0.95 or greater.

14. An imaging assembly according to claim 10, wherein the camera and lens module is mounted on a diagonal framework such that the camera and lens module can synchronously move in a horizontal direction relative to the mirror and in a vertical direction relative to the horizontal plane of the platform.

15. An imaging assembly according to claim 10, further comprising at least one cooling fan mounted to a framework of the imaging assembly in a position that is not in communication with the optical path.

16. An imaging assembly according to claim 15, further comprising at least one flexible duct in communication with the at least one cooling fan and directing air moved by the cooling fan out of the imaging assembly.

17. An imaging assembly according to claim 15, further comprising at least one telescoping duct in communication with the at least one cooling fan and directing air moved by the cooling fan out of the imaging assembly.

18. An imaging assembly according to claim 10, wherein the length of the optical path can change by up to about 31 cm.

19. An imaging assembly according to claim 10, wherein the field of view of the camera and lens module has a width of from about 9 cm to about 21 cm.

20. An imaging assembly according to claim 10, further comprising a sample drawer in which a sample can be positioned and moved into the target region.

* * * * *